(12) United States Patent  (10) Patent No.: US 9,413,412 B2
Gipson  (45) Date of Patent: Aug. 9, 2016

(54) ELECTRONIC DEVICE PROTECTIVE CASE AND ARTICLE CARRYING POUCH

(71) Applicant: Glenfield Gipson, St. Maarten (AN)

(72) Inventor: Glenfield Gipson, St. Maarten (AN)

( * ) Notice: Subject to any disclaimer, the term of this patent is extended or adjusted under 35 U.S.C. 154(b) by 0 days.

(21) Appl. No.: 13/975,411

(22) Filed: Aug. 26, 2013

(65) Prior Publication Data

US 2014/0066142 A1 Mar. 6, 2014

Related U.S. Application Data

(60) Provisional application No. 61/695,017, filed on Aug. 30, 2012.

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
CPC ..... H04M 1/0214; H04M 1/23; H04W 64/00; H04W 88/06; H04W 12/06; H04W 4/12; H04W 56/003
USPC ............ 455/575.8, 575.1; 206/570, 701, 507; 220/507; 361/679.02, 679.43, 679.56
See application file for complete search history.

(56) References Cited

U.S. PATENT DOCUMENTS

| | | | |
|---|---|---|---|
| 5,884,155 A * | 3/1999 | Wicks et al. | 455/321 |
| 7,204,398 B1 | 4/2007 | Smith, Sr. | |
| D639,552 S | 6/2011 | Du | |
| 8,047,364 B2 * | 11/2011 | Longinotti-Buitoni | 206/320 |
| 8,989,826 B1 * | 3/2015 | Connolly | 455/575.8 |
| 2004/0053649 A1 * | 3/2004 | Sun | 455/575.1 |
| 2008/0121322 A1 | 5/2008 | Thomson | |
| 2008/0149679 A1 | 6/2008 | Case et al. | |
| 2011/0077061 A1 | 3/2011 | Danze et al. | |
| 2011/0089077 A1 | 4/2011 | Ziemba | |
| 2011/0228458 A1 * | 9/2011 | Richardson et al. | 361/679.01 |
| 2011/0284407 A1 * | 11/2011 | Connolly | 206/320 |
| 2014/0251368 A1 * | 9/2014 | Lawson et al. | 132/287 |

* cited by examiner

*Primary Examiner* — Huy C Ho

(74) *Attorney, Agent, or Firm* — Global Intellectual Property Agency, LLC; Daniel Boudwin

(57) ABSTRACT

An electronic device protective case and article storage device is provided. The device comprises a case having a front portion and a rear portion adapted to surround an electronic device and protect its structure from scratches and impacts. The front portion supports the electronic device and provides access to the device display screen, while the rear portion is snap-connected to the front portion and optionally hinged therefrom. The rear portion covers the rear of the electronic device and further supports an externally-mounted or internally-mounted pouch. The pouch comprises an expandable compartment for supporting identification, credit cards, cash, and other personal items. The front portion engages the electronic device and is adapted to remain connected with the electronic device when the rear portion is disengaged from accessing the pouch. In this way, the present invention provides a protective device and a convenient storage location for common articles required when traveling.

14 Claims, 4 Drawing Sheets

ELECTRONIC DEVICE PROTECTIVE CASE AND ARTICLE CARRYING POUCH

CROSS REFERENCE TO RELATED APPLICATION

This application claims the benefit of U.S. Provisional Application No. 61/695,017 filed on Aug. 30, 2012, entitled "Cellular Phone Cover N Purse." The above identified patent application is herein incorporated by reference in its entirety to provide continuity of disclosure.

BACKGROUND OF THE INVENTION

1. Field of the Invention

The present invention relates to electronic device covers. More specifically, the present invention pertains to a new and novel cellular phone case having an integrated pouch for storage of credit cards, identification cards, and cash therein.

Cellular phone and smartphone devices are popular electronic devices that are useful for communication, navigation, and for general information gathering while away from home or when away from a personal computer. These devices have broadened the definition of cellular communication devices and have blurred the lines between computers and mobile phones. Because of this increased capability and popularity, it is not uncommon for users to carry their cellular phone with them at all times, both when at home and when away from home.

Along with their cellular phones, when away from home most individuals travel with a set of keys, personal identification, and some form of currency (e.g. cash, credit cards, etc.). These items are transported directly on the user's person, such as in a pants pock, or carried indirectly in a purse or carry item. Organizing these items reduces clutter and reduces the necessary space required to carry the items, which is particularly helpful if carrying the items directly on the user's person or within a larger purse. Quick access to identification, cash and credit cards, and a cellular phone is often required when away from the home. Therefore efficient storage of these items is important to prevent delays at checkout locations, at security check points, and when access to the cellular phone is required to answer incoming phone calls or messages.

Along with organization, many users protect their cellular phone and smartphone devices using an external case. These cases surround the exterior of the phone to provide impact resistance and to prevent cracking or scratching of the display screen over the life of the phone. The cases generally surround the backside of the phone and spread impact loads therearound, reducing stress on the chassis of cell phone, its hardware, and its display screen.

The present invention provides a new electronic device case that combines the protective features of most typical cases with an organization pouch that allows a user to store various cards and currency items therein. This provides a user with a singular item that can organize and store several different objects that are otherwise carried in one's pocket or purse, improving organization and efficiency of access. Two primary embodiments are contemplated, wherein the case is separated into a forward and rear section, the rear section supporting the pouch along the interior surface or exterior surface thereof. The shape of the present case can be adapted to support different electronic devices, including smartphones, media players, tablets, or PDAs.

2. Description of the Prior Art

Devices have been disclosed in the prior art that relate to cellular phone cases and organizational articles. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

Articles in the prior art relate to carrying cases, protective cases, and various structures for electronic devices, wherein the articles provide an additional storage means in conjunction with the connection to the electronic device. The present invention describes an electronic device cover having a rear portion that supports a pouch, the pouch being internally or externally disposed thereon. The rear portion and front portion of the cover secure together in two primary embodiments: snap connection or hinged connection. Overall, the present invention is designed to offer protection for a cellular phone or similar electronic device while offering carrying capacity for card and cash items without overly expanding the size of the protective case.

One such article in the prior art is U.S. Patent Publication No. 2008/0121322 to Thomson, which discloses a cellular phone wallet sleeve for holding identification and credit cards with a cellular phone. The sleeve is adapted to cover the upper portion of a flip-style phone, providing a backside pocket and an interior arrangement that allows the user to readily visualize the cellular phone screen. The sleeve is comprised of a band and a pocket area for supporting the card items along the backside of the phone. While the Thompson device provides a means of supporting items with a cellular phone, the structure of the Thompson device and its intended use with a flip phone are differentiated from the present invention.

Another such device is U.S. Patent Publication No. 2011/0089077 to Ziemba, which discloses a compartmentalized, protective cellular phone case that includes a major compartment for storing and receiving a cellular phone therein, along with at least one other compartment adapted to receive personal articles therein. The arrangement is disclosed in a hinged, flip fashion between compartments wherein the compartments are in pivotable connection with one another. The present invention discloses a phone case that surrounds the sides and rear of the phone, while at the same time providing a pocking means of supporting personal items thereon.

Finally, U.S. Patent Publication No. 2011/0077061 to Danze discloses a cellular phone case that includes a protective shell around a cellular phone device, wherein an operative back cover includes interchangeable trays to supporting a variety of personal items, such as makeup, pills, and money. A front housing supports the phone therein, while the trays are positioned behind the phone and within the housing to support the items behind the cellular phone therein. Several embodiments are disclosed; however none disclose a structure comprising an internal or external pouch for money and card storage, as provided herein. The present invention discloses a cover having a rear side portion that supports a pouch along the interior or exterior surface thereof, wherein the rear portion secures to the front case section supporting the cell phone around its outer edge.

The present invention pertains to a new and novel electronic device case that provides support for cash, cards, and other personal items therein. The structure of the present invention is submitted as being substantially divergent in design elements from the prior art, and consequently it is clear that there is a need in the art for an improvement to existing electronic device cases. In this regard the instant invention substantially fulfills these needs.

SUMMARY OF THE INVENTION

In view of the foregoing disadvantages inherent in the known types of electronic device cases now present in the prior art, the present invention provides a new protective case and article carrier that can be utilized for providing convenience for the user when carrying personal items in conjunction with an electronic device.

It is therefore an object of the present invention to provide a new and improved electronic device case that has all of the advantages of the prior art and none of the disadvantages.

It is another object of the present invention to provide an electronic device case that surrounds an electronic device for the purposes of protecting the device and offering a means of personal article storage therein.

Another object of the present invention is to provide an electronic device case that protects the electronic device from impacts and scratches, wherein the electronic device exterior is surrounded by a hardened shell exterior that spread load around the shell and prevents dings, cracks, or hardware failure if the device is dropped.

Yet another object of the present invention is to provide an electronic device case that includes a rear-mounted article pouch that is suitable for carrying thin personal items, such as credit cards, cash items, keys, and other items that have a relatively thin cross section.

Another object of the present invention is to provide an electronic device case that comprises a front and back portion, the front portion supporting the electronic device while the rear portion is separable therefrom and supports the article pouch thereon.

Another object of the present invention is to provide an electronic device case that can be readily snapped together around a smartphone device, a media player, or a tablet, wherein the case is completely separable or the front and rear portions are hinged connected to one another.

A final object of the present invention is to provide an electronic device case that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
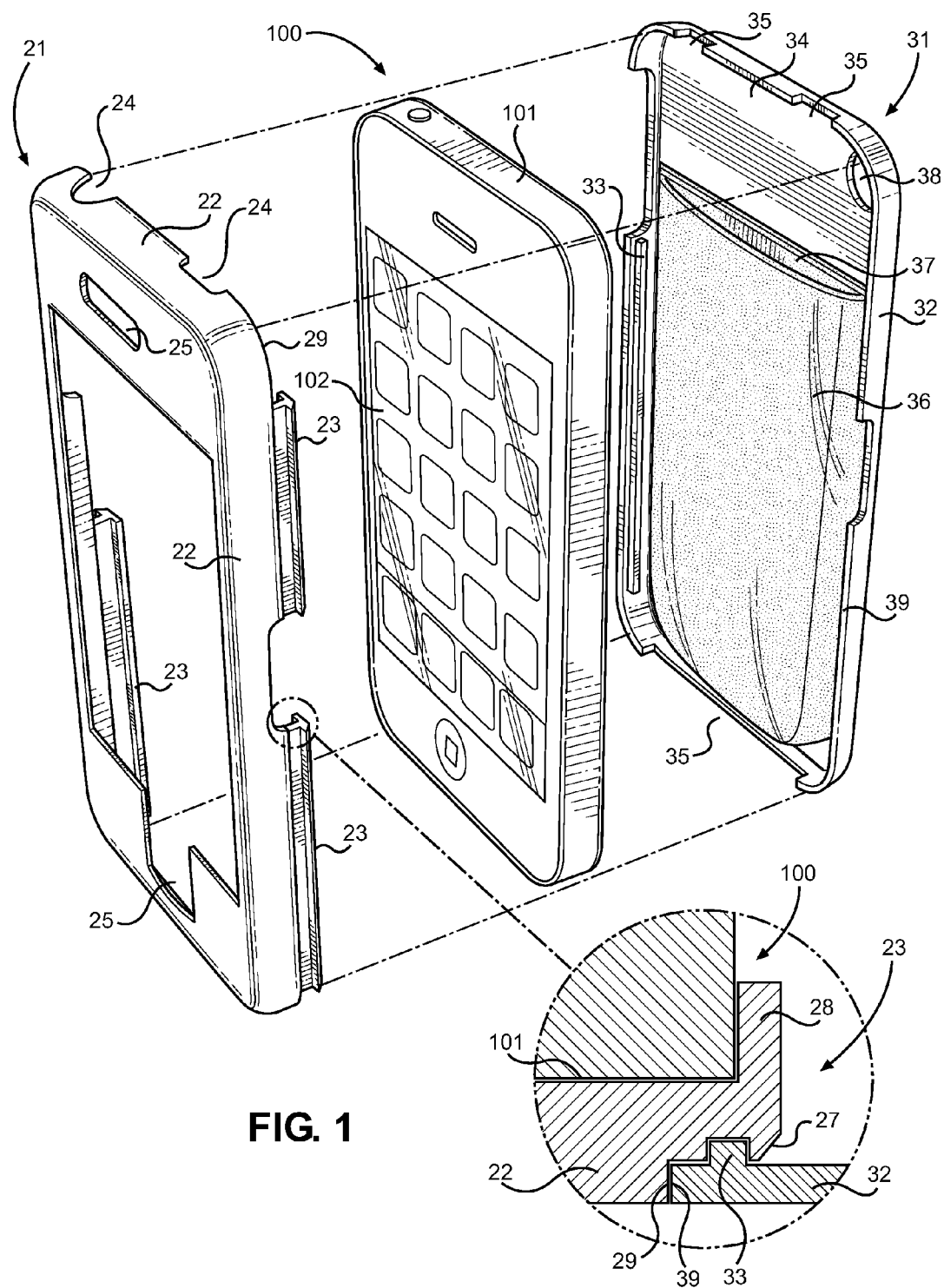
FIG. 1 shows an exploded perspective view of an embodiment of the present invention, along with a close-up of the connector between the case front and back portion.

Reference is made herein to the attached drawings. Like reference numerals are used throughout the drawings to depict like or similar elements of the electronic device case. For the purposes of presenting a brief and clear description of the present invention, the preferred embodiment will be discussed as used for protecting the structure of the electronic device while offering a means of storage for the user. The figures are intended for representative purposes only and should not be considered to be limiting in any respect.

Referring now to FIG. 1, there is shown an exploded perspective view of an embodiment of the present invention. The device comprises an electronic device case having a front portion 21 and a rear portion 31, wherein the case is adapted to surround the exterior edge 101 of the electronic device 100 and protect its surfaces and internal hardware from impact or contact damage with other articles. The front portion 21 of the case comprises a sidewall 22, a perimeter edge 29, frontal cut-outs 25 for the device screen 102, edge cut-outs 24 for other device interface regions, and a rear-facing connector element 23. The cut-outs 25 provide access to the device screen 102 and its peripheral features/inputs when supported by the case. The features may include the device touchscreen 102, a keypad, a speaker, a camera aperture, volume control buttons, and other similar features typically found on a hand-held electronic device.

The rear portion 31 of the case is adapted to surround the rear portion of the electronic device 100 and provide an article carrying pouch 36 thereon for storage of personal items in conjunction with the electronic device 100. The rear portion comprises a rear surface 34, a perimeter sidewall 32, a perimeter edge 39, and an article pouch 36. Similar to the front portion 21, the rear portion of the case may also have several rear surface cut-outs 38 and edge cut-outs 35 disposed thereon for providing clearance to the electronic device and its inputs while supported within the case interior. Along the interior of the rear portion sidewalls 32 is an upstanding lip 33 that is adapted to interact with the rear-facing connector element 23 of the case front portion 21 when engaging the two portions together about the electronic device.

The case of the present invention has a particular attachment means that connects the front 21 and rear 31 portions of the case together about the exterior of the electronic device 100. In a preferred embodiment, the front portion includes a rear-facing connector element 23 that supports the electronic device 100 within the sidewalls 22 of the front portion 21, while also providing a means of snap-connecting the rear portion 31 thereto. The connector element 23 preferably comprises a rear facing extension having an inward directed ledge 28 and an outward chamfered edge 27. The inward directed ledge 28 retains the electronic device 100 against the interior surface of the case front portion and prevents separation of the front portion 21 from the device 100, independent of any connection to the rear portion.

When connecting the rear portion 31 of the case to the front portion 21, the perimeter edges 29, 39 of the two portions are aligned, and the chamfered edge 27 is pressed over the upstanding lip 33 of the rear portion. This cases a snapping action, whereby the connector element 23 temporarily deforms inward when passing over the lip 33, and then thereafter returning to its original position along the interior of the rear portion 31 and along the inward side of the lip 33. This connection secures the two case portions together and also allows the user to remove the rear portion 31 without having the electronic device 100 become disconnected from the front portion 21. In this way, the user is only responsible for handling two items when accessing the pouch 36 of the rear portion: the connected front portion and device 100, and the rear portion 31. This facilitates ease of access when and less fumbling when accessing the inner surface-mounted pouch 36 (as shown in FIG. 1 through 3).

When connected, the sidewalls 22, 32 of the front and rear portions are aligned and their perimeter edges 39, 29 abut against one another to form a close-tolerance case about the electronic device. The electronic device 100 itself may comprise a smartphone device, an electronic media player device, a PDA, a tablet, or any similar personal handheld device that requires protection and that is regularly carried by a user. The size and shape of the electronic device may have a specific design, whereby the case geometry and structure can be tailored to match the contours of the electronic device edges 101 and inputs.

The pouch 36 of the present invention is preferably an elastic or semi-elastic surface that is connected to a surface of the case rear portion 31 along three of its rectangular edges. The pouch 36 provides an open upper 37 for accepting therethrough personal items such as credit cards, identification cards, individual keys, and the like. In this way, the case allows a user to carry both an electronic device and other personal articles that are commonly carried on one's person when away from home (e.g. identification, cash and cards, etc.)

Figure 2:
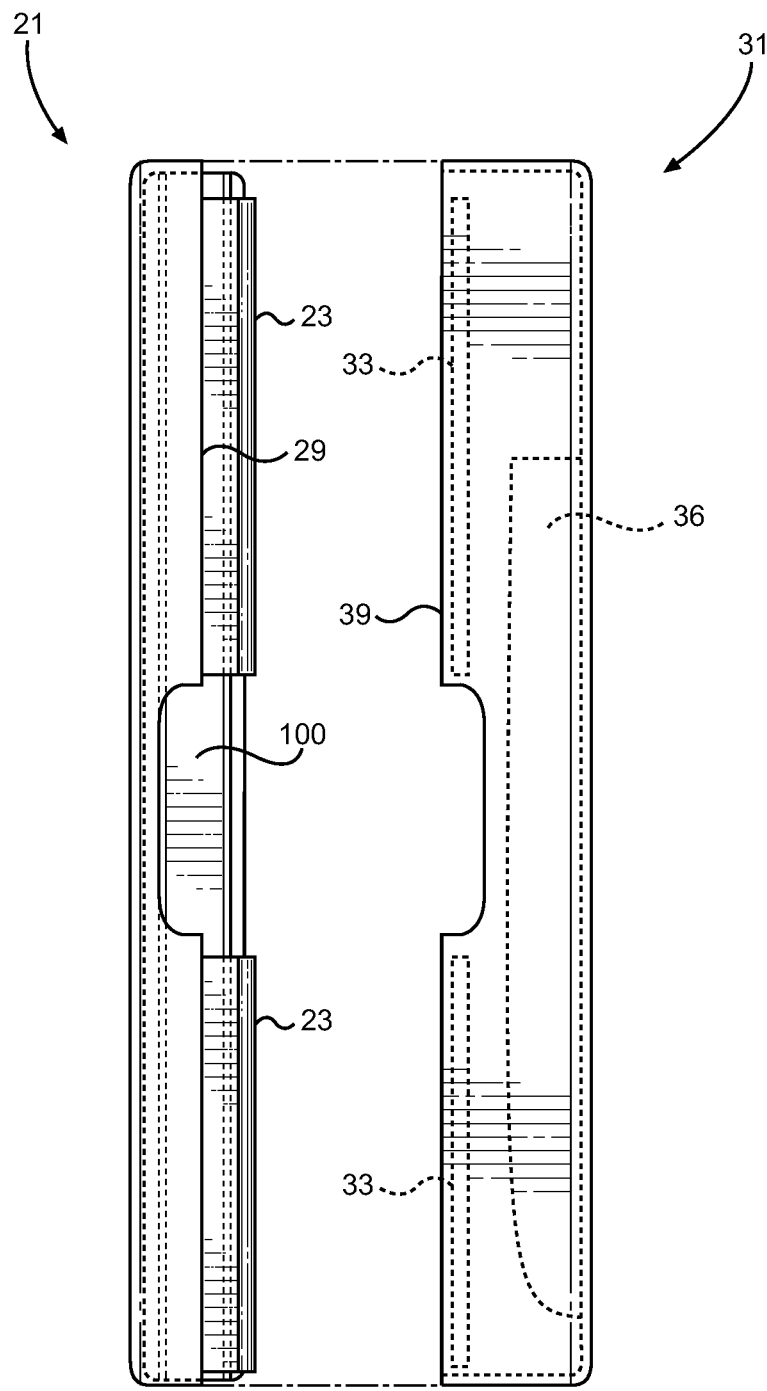
FIG. 2 shows an exploded side view of the present invention, wherein the electronic device and its connection to the front portion are illustrated.
Figure 3:
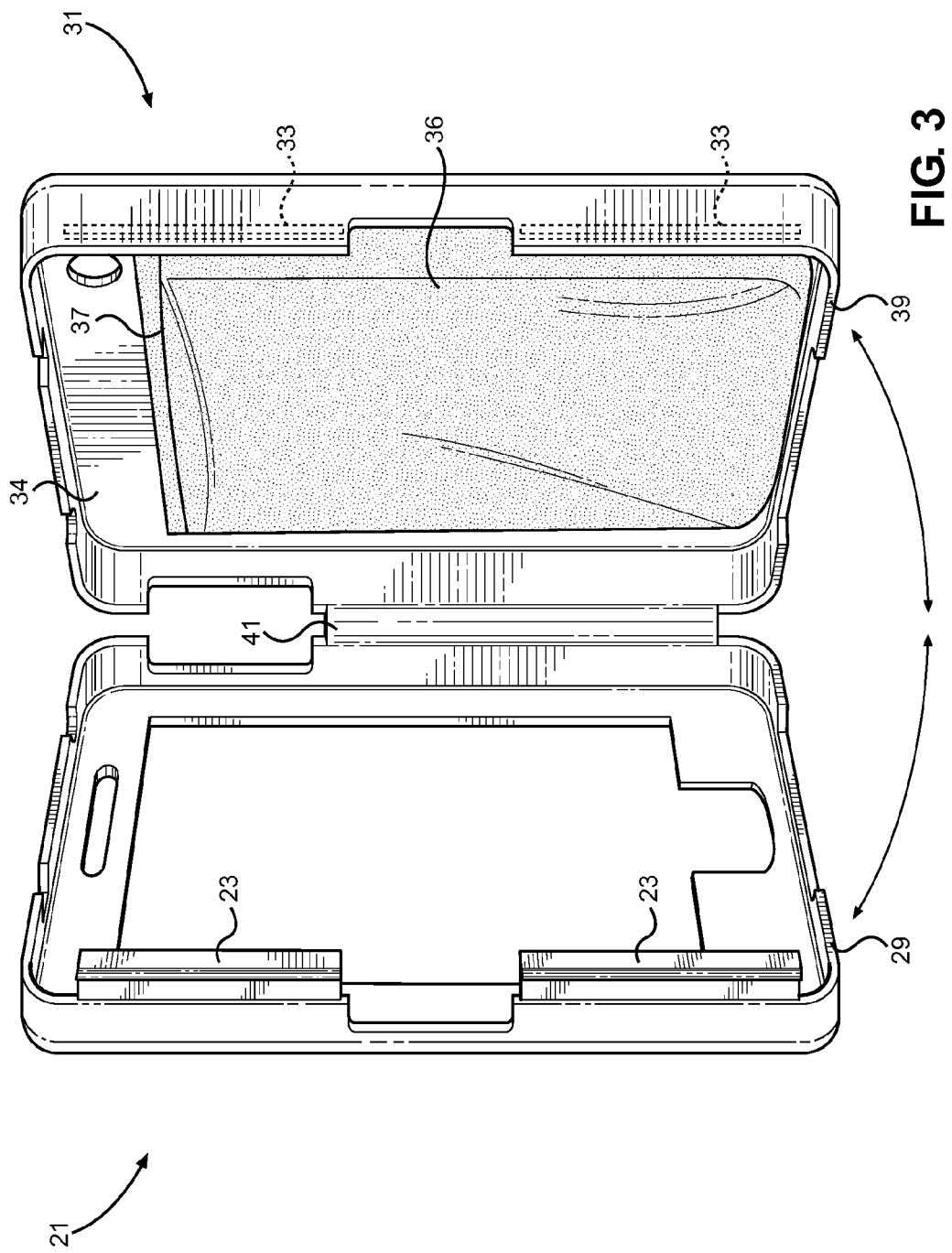
FIG. 3 shows a view of a second embodiment of present invention, wherein the front and rear portion of the case is hingedly connected.

Referring now to FIG. 2, there is shown an exploded side view of the present invention, wherein the pouch 36 is disposed within the interior of the rear portion 31 and the electronic device 100 is securably retained within the case front portion 21 when disconnected from the rear portion 31. As visualized, the rear-facing connector element 23 secures the electronic device 100 within the front portion 21 interior, while also extending a means of connection between the two case portions that is adapted to connect the portions along their aligned perimeter edges 29, 39. The connector element 23 engages with the upstanding lip 33 within the rear portion to snap the case together about the electronic device 100. When accessing the internal pouch 36, the user separates the rear portion 31 from the case front portion 21 to retrieve or store items within the pouch 36. The electronic device 100 is retained within the case front portion 21 and does not separate therefrom. Once access to the pouch is no longer desired, the case rear portion 31 can be re-engaged with the front portion 21 by snapping the two together.

Referring now to FIG. 3, there is shown a perspective view of an alternate embodiment of the present invention. In this embodiment, the front 21 and rear 31 portions of the case are hingedly attached 41 to one another along a common edge. The opposing edge connects in the same fashion as the first embodiment, wherein a rear-facing connector element 23 is theredisposed. The connector element 23 secures to an upstanding lip 33 within the corresponding sidewall of the rear portion 31. The connector element 23 retains the electronic device within the front portion interior, while the hinge joint 41 between the case portions facilitates access into the case rear portion and into the article pouch 36 disposed therein. The pouch 36 is secured to the interior of the rear portion surface 34, wherein the pouch open upper 37 allows for securing various personal items therein when the case portions are closed. Similar to the first embodiment, the electronic device is retained within the first portion, however in this embodiment the rear portion 31 is note completely separable from the case front portion 31.

Figure 4:
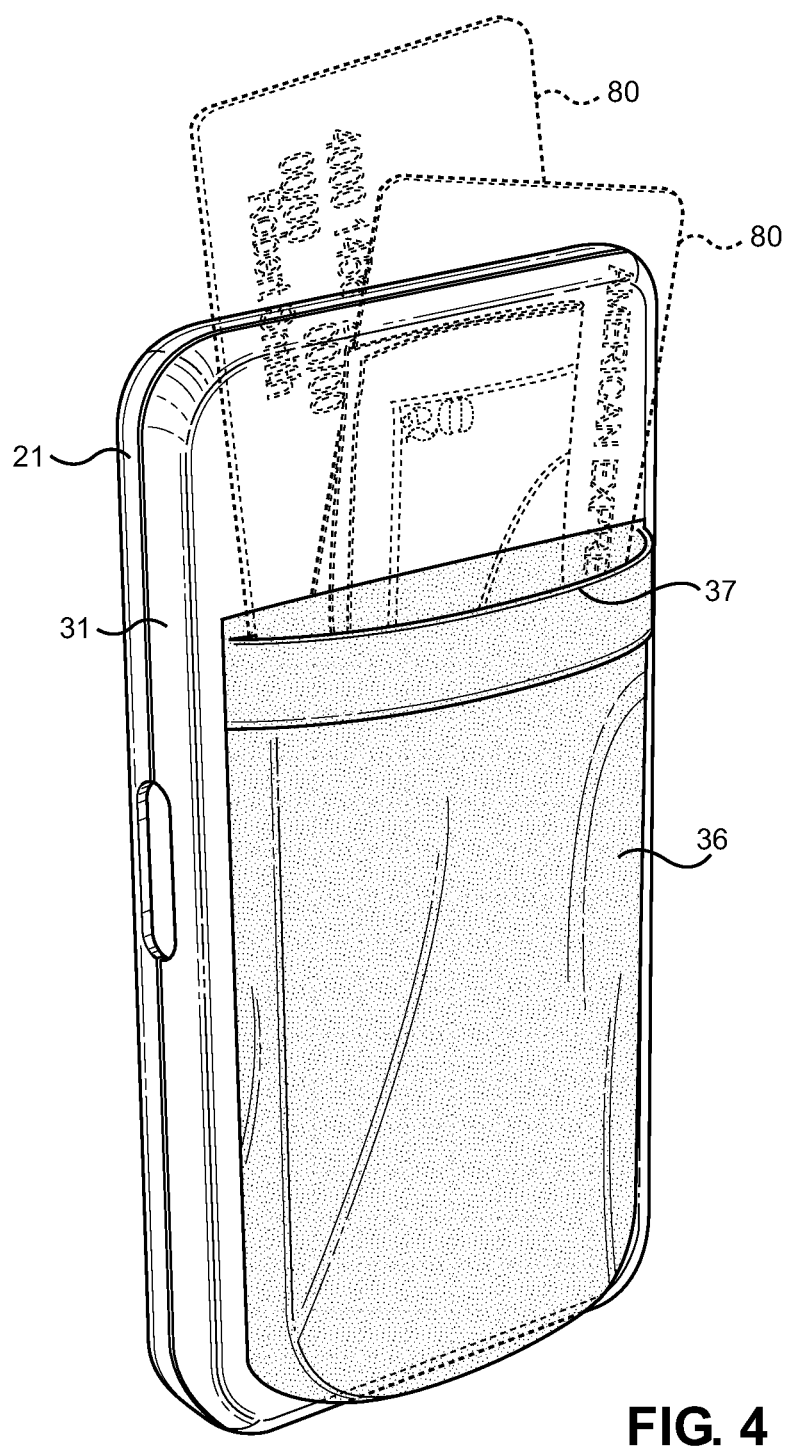
FIG. 4 shows a rear view of the present invention in a working state, wherein the article support pouch is mounted to the rear surface of the case rear portion for supporting credit card and cash items.

Referring now to FIG. 4, there is shown perspective view of yet another embodiment of the present invention. In this embodiment, the article pouch 36 is disposed along the exterior of the case rear portion 31. This arrangement allows a user to access the pouch contents without separating the front 21 and rear 31 case portions, and the articles 80 can be quickly and easily retrieved when necessary. However, this embodiment provides less concealment for the items and less security, as the items 80 are positioned within the pouch 36 and the opening 37 thereof is readily accessible. Preferably the pouch 36 is comprised of an elastic material that stretches to accommodate its contents while securing the same therein. This allows the user to place many items into the pouch (pouch stretching) and reduces the likelihood of articles simply falling out of the pouch during use (pouch interior compression).

Overall, the device provides a protective case for an electronic device and a means of storage therewith. Taking a large purse or stuffing one's pockets with necessary items when going for a walk or making a quick trip can be inconvenient. Most people do not have a single place to put their essentials, including a cellular phone, identification, credit/debit card and cash. If a person has several pockets, he or she may have to empty each one onto the counter, which could take time and hold up the check-out line at a store. Then the person may forget something at the register while gathering his or her packages, change and cell phone.

The present invention provides a convenient means of combining features of a carrying case with a protective electronic device case. Along one side of the device is a protective case, while the rear portion supports an article pouch thereon or therein. This allows a user to carry both his or her valuable items as well as a mobile phone or media device at the same time. Anyone who wants to carry just the essentials without the use of a bag or billfold may utilize this device.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device case, comprising:
   a case front portion and a rear portion;
   said case front portion comprising perimeter sidewalls having a rear-facing perimeter edge therealong, adapted to surround an electronic device;
   said case rear portion comprising a rear surface and perimeter sidewalls having a front-facing perimeter edge therealong;

an article pouch disposed on said case rear portion, said article pouch having an open upper and adapted to accept rectangular articles therein;
said perimeter edges of said case front and rear portions adapted to align and establish an interior volume suitable for an electronic device;
a first rear-facing connector element extending from a perimeter edge of a first sidewall of said case front portion;
a second rear-facing connector element extending from a perimeter edge of a second sidewall of said case front portion;
each of said first rear-facing connector element and said second rear-facing connector element having an inwardly directed ledge and an outwardly directed chamfered edge;
a first upstanding lip along an interior surface of a first perimeter sidewall of said case rear portion;
a second upstanding lip along an interior surface of a second perimeter sidewall of said case rear portion;
wherein said outwardly directed chamfered edge of said first rear-facing connector element and said outwardly directed chamfered edge of said second rear-facing connector element are configured to removably receive said first upstanding lip and said second upstanding lip, respectively, thereby abutting said rear-facing perimeter edge of said front portion and said front-facing perimeter edge of said rear portion and securing said front portion and said rear portion together;
wherein said inwardly directed ledge is configured to retain an electronic device within said front portion when said rear portion is removed from said front portion.

2. The device of claim 1, wherein:
said article pouch is secured to the interior side of said case rear portion rear surface;
said rear portion sidewalls extending forward sufficiently to accommodate said pouch when connected to said front portion.

3. The device of claim 1, wherein said article pouch is secured to the exterior side of said case rear portion rear surface.

4. The device of claim 1, wherein said case front portion further comprise at least one frontal cut-out.

5. The device of claim 1, wherein said case front portion further comprise at least one edge cut-out.

6. The device of claim 1, wherein the article pouch is fabricated from an elastic material.

7. The device of claim 1, wherein the article pouch is rectangular in shape.

8. An electronic device case, comprising:
a case front portion and a rear portion;
said case front portion comprising perimeter sidewalls having a rear-facing perimeter edge therealong, adapted to surround an electronic device;
said case rear portion comprising a rear surface and perimeter sidewalls, having a front-facing perimeter edge therealong;
an article pouch disposed on said case rear portion, said article pouch having an open upper and adapted to accept rectangular articles therein;
said perimeter edges of said case front and rear portions adapted to align and establish an interior volume suitable for an electronic device;
a first perimeter sidewall of said front portion hingedly connected to a first perimeter sidewall of said rear portion at a common perimeter edge;
a rear-facing connector element extending from a perimeter edge of a second sidewall of said case front portion;
said rear-facing connector element having an inwardly directed ledge and an outwardly directed chamfered edge;
an upstanding lip along an interior surface of a second perimeter sidewall of said case rear portion;
wherein said outwardly directed chamfered edge of said rear-facing connector element is adapted to removably receive said upstanding lip, thereby abutting said rear-facing perimeter edge of said front portion and said front-facing perimeter edge of said rear portion and securing said front portion and said rear portion together;
wherein said inwardly directed ledge is adapted to retain an electronic device within said case front portion when said rear portion is removed from said front portion.

9. The device of claim 8, wherein:
said article pouch is secured to the interior side of said case rear portion rear surface;
said rear portion sidewalls extending forward sufficiently to accommodate said pouch when connected to said front portion.

10. The device of claim 8, wherein said article pouch is secured to the exterior side of said case rear portion rear surface.

11. The device of claim 8, wherein said case front portion further comprise at least one frontal cut-out.

12. The device of claim 8, wherein said case front portion further comprise at least one edge cut-out.

13. The device of claim 8, wherein the article pouch is fabricated from an elastic material.

14. The device of claim 8, wherein the article pouch is rectangular in shape.

* * * * *